United States Patent
Mang et al.

(10) Patent No.: US 12,252,611 B2
(45) Date of Patent: Mar. 18, 2025

(54) PRODUCTION OF BIMODAL MOLECULAR WEIGHT POLY (HYDROXYALKANOATES)

(71) Applicant: Danimer IPCo, LLC, Bainbridge, GA (US)

(72) Inventors: Michael Mang, Bainbridge, GA (US); Phillip Van Trump, Decatur, GA (US)

(73) Assignee: DANIMER IPCo. LLC, Bainbridge, GA (US)

( * ) Notice: Subject to any disclaimer, the term of this patent is extended or adjusted under 35 U.S.C. 154(b) by 0 days.

(21) Appl. No.: 18/672,788

(22) Filed: May 23, 2024

(65) Prior Publication Data

US 2024/0309206 A1    Sep. 19, 2024

Related U.S. Application Data

(62) Division of application No. 17/876,921, filed on Jul. 29, 2022, now abandoned.

(60) Provisional application No. 63/226,826, filed on Jul. 29, 2021.

(51) Int. Cl.
*C08L 67/04* (2006.01)
*C08J 5/18* (2006.01)

(52) U.S. Cl.
CPC .................. *C08L 67/04* (2013.01); *C08J 5/18* (2013.01); *C08J 2367/04* (2013.01); *C08J 2467/04* (2013.01); *C08L 2203/12* (2013.01); *C08L 2203/16* (2013.01); *C08L 2205/02* (2013.01)

(58) Field of Classification Search
CPC ...... C08G 63/08; C08G 63/78; C08J 2367/04; C08J 2467/04; C08L 2205/02; C08L 67/04; D01F 6/625
See application file for complete search history.

(56) References Cited

U.S. PATENT DOCUMENTS

| | | |
|---|---|---|
| 5,389,447 A | 2/1995 | Blume et al. |
| 2003/0236358 A1 | 12/2003 | Autran et al. |
| 2017/0072113 A1 | 3/2017 | Andjelic et al. |
| 2017/0198136 A1 | 7/2017 | Minami et al. |
| 2020/0369825 A1 | 11/2020 | Vakil |

FOREIGN PATENT DOCUMENTS

WO    2020127008 A1    6/2020

OTHER PUBLICATIONS

Roger Thomas and Benedikt Schlicke Authorized Officers of European Patent Office, date of mailing Nov. 14, 2022, PCT/US2022/038817, 12 pages.

*Primary Examiner* — Ana L. Woodward
(74) *Attorney, Agent, or Firm* — Luedeka Neely, P.C.

(57) ABSTRACT

A poly(hydroxyalkanoate) composition having a bimodal molecular weight distribution. The composition includes of a first portion and a second portion of a poly(hydroxyalkanoate). The first portion has a first weight average molecular weight and the second portion has a second weight average molecular weight which is at least 50 percent less than the first weight average molecular weight. The poly (hydroxyalkanoate) is made up of at least 10 mole percent monomer repeat units of 3-hydroxypropionate. A method for making the composition is also disclosed.

5 Claims, No Drawings

PRODUCTION OF BIMODAL MOLECULAR WEIGHT POLY (HYDROXYALKANOATES)

FIELD

This disclosure relates to biodegradable polymeric compositions. More particularly, this disclosure relates to a poly(hydroxyalkanoate) composition having a bimodal molecular weight distribution and to a method for making such a composition.

BACKGROUND

Poly(hydroxyalkanoates) may be prepared by a ring opening polymerization process. In such a polymerization, the physical properties of the polymer are often a function of molecular weight. In order to obtain desirable physical properties, it is often desirable to produce polymers with molecular weights that are as high as can be achieved.

However, not all physical properties improve with increasing molecular weight. For instance, melt viscosity is a strong function of molecular weight and thermal processing of the polymer in typical conversion equipment can be difficult if the melt viscosity is too high.

Thus, it would be desirable to provide a poly(hydroxyalkanoate) composition which has a high molecular weight and which exhibits many of the advantageous physical properties associated with higher molecular weights, while at the same time, exhibiting a lower melt viscosity typically associated with lower molecular weights.

SUMMARY OF THE INVENTION

In response to the above and other needs, the present disclosure provides a poly(hydroxyalkanoate) composition having a bimodal molecular weight distribution. In other words, the molecular weight distribution of the poly(hydroxyalkanoate) in the composition exhibits two distinct molecular weight peaks.

In general, the composition comprises a first portion of a poly(hydroxyalkanoate) and a second portion of the poly (hydroxyalkanoate). Each of the first portion and the second portion has its own distinct weight average molecular weight. Thus, the first portion of the poly(hydroxyalkanoate) has a first weight average molecular weight and the second portion of the poly(hydroxyalkanoate) has a second weight average molecular weight. According to the present disclosure, the second weight average molecular weight which is at least 50 percent less than the first weight average molecular weight.

More particularly, the first weight average molecular weight is typically at least 100,000 daltons, as determined by ASTM D5296. Preferably, the first weight average molecular weight is at least 200,000 daltons, as determined by ASTM D5296. Even more preferably, the first weight average molecular weight is at least 300,000 daltons, as determined by ASTM D5296.

By contrast, the second weight average molecular weight is preferably less than about 25,000 daltons, as determined by ASTM D5296.

With this difference in molecular weights, the composition typically has a polydispersity of at least 1.9, as determined by ASTM D5296. More preferably, the composition typically has a polydispersity from about 1.9 to about 3.5 as determined by ASTM D5296

Typically, the composition includes from about 90 to about 50 weight percent of the first portion of the poly (hydroxyalkanoate) and from about 50 to about 10 weight percent of the second portion of the poly(hydroxyalkanoate). More preferably, the composition includes from about 85 to about 60 weight percent of the first portion of the poly (hydroxyalkanoate) and from about 40 to about 15 weight percent of the second portion of the poly(hydroxyalkanoate).

In some embodiments, the weight ratio of the first portion of the poly(hydroxyalkanoate) to the second portion of the poly(hydroxyalkanoate) from about 1:1 to about 9:1

The poly(hydroxyalkanoate) of the present composition comprises at least 10 mole percent monomer repeat units of 3-hydroxypropionate. In certain embodiments, the poly(hydroxyalkanoate) may comprise at least 25, at least 50, or at least 75 mole percent monomer repeat units of 3-hydroxypropionate.

In broad terms, the poly(hydroxyalkanoate) of the composition may be a homopolymer, a copolymer, or a terpolymer. Thus, in certain embodiments, the poly(hydroxyalkanoate) comprises a homopolymer, namely, poly(3-hydroxypropionate).

In other embodiments, the poly(hydroxyalkanoate) comprises a copolymer or a terpolymer which includes
a first repeat unit which is (3-hydroxypropionate),
a second repeat unit according to Formula I

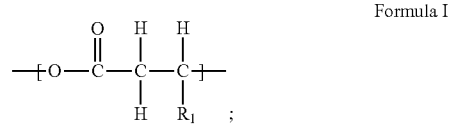

Formula I and
optionally, a third repeat unit according to Formula II,

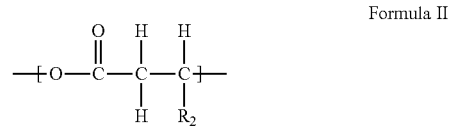

Formula II wherein $R_1$ and $R_2$ are each independently selected from the group consisting of linear or branched alkyl groups having from 1 to 22 carbon atoms.

In some embodiments, this poly(hydroxyalkanoate) is more preferably a copolymer and $R_1$ is methyl. In such embodiments, the poly(hydroxyalkanoate) copolymer preferably comprises from about 10 to about 90 mole percent of the first repeat unit and from about 90 to about 10 mole percent of the second repeat unit.

In other embodiments, the poly(hydroxyalkanoate) is more preferably a terpolymer, in which $R_1$ is methyl and $R_2$ is propyl. In such embodiments, the poly(hydroxyalkanoate) terpolymer preferably comprises from about 15 to about 75 mole percent of the first repeat unit, from about 75 to about 15 mole percent of the second repeat unit, and from about 1 to about 5 mole percent of the third repeat unit.

Advantageously, this bimodal poly(hydroxyalkanoate) composition has been found to provide good physical properties associated with higher molecular weights while also having a reduced melt viscosity.

The present disclosure also provides various articles which incorporate the aforementioned poly(hydroxyalkanoate) composition. In one embodiment, the disclosure provides a film which is made up of a poly(hydroxyalkanoate)

composition having a bimodal molecular weight distribution. In another embodiment, the disclosure provides a fiber which is made up of a poly(hydroxyalkanoate) composition having a bimodal molecular weight distribution.

In a further aspect, the present disclosure provides a method for making a composition having a first portion of a poly(hydroxyalkanoate) and a second portion of the poly (hydroxyalkanoate). According to one embodiment, the method includes a step of polymerizing a first charge of at least one substituted lactone to produce a first portion of a poly(hydroxyalkanoate) having a first weight average molecular weight. The method also includes a step of polymerizing a second charge of the at least one substituted lactone to produce a second portion of the poly(hydroxyalkanoate) having a second weight average molecular weight. The second weight average molecular weight is at least 50 percent less than the first weight average molecular weight.

The method further includes a step of blending the first portion and the second portion to produce a final poly (hydroxyalkanoate).

According to the present disclosure, the at least one substituted lactone includes beta-propiolactone and the poly (hydroxyalkanoate) includes monomer repeat units of 3-hydroxypropionate.

In accordance with certain embodiments of the method, the poly(hydroxyalkanoate) is a homopolymer, namely, poly (3-hydroxypropionate).

In other embodiments of the method, the poly(hydroxyalkanoate) is a copolymer or a terpolymer which is made up of a first repeat unit which is (3-hydroxypropionate),
a second repeat unit according to Formula I

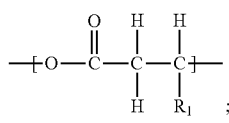

Formula I and
optionally, a third repeat unit according to Formula II,

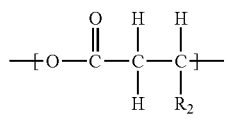

Formula II wherein $R_1$ and $R_2$ are each independently selected from the group consisting of linear or branched alkyl groups having from 1 to 22 carbon atoms.

In some embodiments of the method, the first charge is preferably polymerized in a first loop reactor. In some instances, the second charge is also preferably polymerized in a second loop reactor.

In accordance with some embodiments of the method, the step of blending the first portion and the second portion is carried out by polymerizing the second charge to form the second portion in the presence of the first portion.

DETAILED DESCRIPTION

The present disclosure provides a poly(hydroxyalkanoate) composition having a bimodal molecular weight distribution. This poly(hydroxyalkanoate) composition is industrially compostable and/or home compostable, as determined by ASTM D6400.

In accordance with one embodiment, the composition is made up of a first portion of a poly(hydroxyalkanoate) and a second portion of the poly(hydroxyalkanoate). The first portion of the poly(hydroxyalkanoate) has a first weight average molecular weight and the second portion of the poly(hydroxyalkanoate) has a second weight average molecular weight which is at least 50 percent less than the first weight average molecular weight. Further, according to the present disclosure, the poly(hydroxyalkanoate) is made up of at least 10 mole percent monomer repeat units of 3-hydroxypropionate.

In general, the poly(hydroxyalkanoate) of the composition may be a homopolymer, a copolymer, or a terpolymer. Thus, in certain embodiments, the poly(hydroxyalkanoate) is a homopolymer, namely, poly(3-hydroxypropionate).

In other embodiments, the poly(hydroxyalkanoate) is a copolymer or a terpolymer which is made up of a first repeat unit which is (3-hydroxypropionate),
a second repeat unit according to Formula I

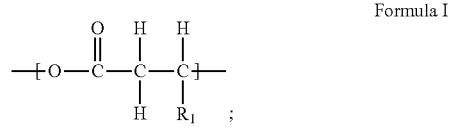

Formula I and
optionally, a third repeat unit according to Formula II,

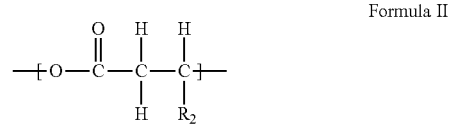

Formula II wherein $R_1$ and $R_2$ are each independently selected from the group consisting of linear or branched alkyl groups having from 1 to 22 carbon atoms.

In some embodiments, the poly(hydroxyalkanoate) is more preferably a copolymer and $R_1$ is methyl. In such embodiments, the poly(hydroxyalkanoate) copolymer is generally made up of from about 10 to about 90 mole percent of the first repeat unit and from about 90 to about 10 mole percent of the second repeat unit.

In other embodiments, the poly(hydroxyalkanoate) is more preferably a terpolymer, in which $R_1$ is methyl and $R_2$ is propyl. In such embodiments, the poly(hydroxyalkanoate) terpolymer is generally made up of from about 15 to about 75 mole percent of the first repeat unit, from about 75 to about 15 mole percent of the second repeat unit, and from about 1 to about 5 mole percent of the third repeat unit.

According to certain embodiments, the composition includes from about 90 to about 50 weight percent of the first portion of the poly(hydroxyalkanoate) and from about 50 to about 10 weight percent of the second portion of the poly(hydroxyalkanoate).

In some embodiments, the weight ratio of the first portion of the poly(hydroxyalkanoate) to the second portion of the poly(hydroxyalkanoate) from about 1:1 to about 9:1.

In some instances, the first weight average molecular weight is at least 100,000 daltons, as determined by ASTM D5296 and the second weight average molecular weight is less than about 25,000 daltons, as determined by ASTM D5296.

In certain embodiments, the composition has a polydispersity of at least 1.9, as determined by ASTM D5296.

The bimodal poly(hydroxyalkanoate) composition according to the present disclosure have been good physical properties associated with higher molecular weights while also having a reduced melt viscosity.

The present disclosure also provides various articles which incorporate the aforementioned poly(hydroxyalkanoate) composition.

For instance, in one embodiment, the disclosure provides a film which is made up of a poly(hydroxyalkanoate) composition having a bimodal molecular weight distribution. The film structure may be formed by blown film extrusion, cast film extrusion, or cast film extrusion followed by biaxial orientation. Such films may be used in end applications such as bags, pouches, food packaging, agricultural mulch film, and protective packaging.

In another embodiment, the disclosure provides fibers which is made up of a poly(hydroxyalkanoate) composition having a bimodal molecular weight distribution. These fibers may be formed by extrusion as staple fibers, monofilament, or as nonwoven webs. The fibers may be used in end applications such as textiles, wipes, diapers, hygiene products, yarns, or geotextiles.

In a further aspect, the present disclosure also provides a method for making a poly(hydroxyalkanoate) composition having a bimodal molecular weight distribution. As described above, the poly(hydroxyalkanoate) composition includes a first portion of a poly(hydroxyalkanoate) and a second portion of the poly(hydroxyalkanoate), with each portion having its own distinct weight average molecular weight and with the second weight average molecular weight (i.e., of the second portion) being substantially lower than the first weight average molecular weight (i.e., of the first portion).

In general, according to the method, both the first and second portions of the poly(hydroxyalkanoate) are formed by a ring opening polymerization of a substituted lactone.

Thus, the method includes a first step of polymerizing a first charge of at least one substituted lactone to produce a first portion of a poly(hydroxyalkanoate) having a first weight average molecular weight.

The method also includes a step of polymerizing a second charge of the at least one substituted lactone to produce a second portion of the poly(hydroxyalkanoate) having a second weight average molecular weight.

The method also includes a step of blending the first portion and the second portion to produce a final poly(hydroxyalkanoate).

A variety of different forms of poly(hydroxyalkanoate), having a bimodal molecular weight distribution, may be prepared according to the method of the present disclosure. The nature of the poly(hydroxyalkanoate) is determined by the at least one substituted lactone which is used a starting material.

In general, the at least one substituted lactone comprises at least beta-propiolactone and the resultant poly(hydroxyalkanoate) comprises monomer repeat units of 3-hydroxypropionate which are formed from the ring opening of the beta-propiolactone.

In some instances, beta-propiolactone is the only substituted lactone starting material and the resultant poly(hydroxyalkanoate) is a homopolymer, namely, poly(3-hydroxypropionate).

In other embodiments of the method, the poly(hydroxyalkanoate) is a copolymer or a terpolymer which is made up of
a first repeat unit which is (3-hydroxypropionate),
a second repeat unit according to Formula I

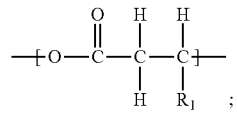

Formula I and
optionally, a third repeat unit according to Formula II,

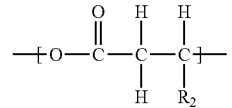

Formula II wherein $R_1$ and $R_2$ are each independently selected from the group consisting of linear or branched alkyl groups having from 1 to 22 carbon atoms.

In some embodiments, the poly(hydroxyalkanoate) is preferably a copolymer in which $R_1$ is methyl. In such embodiments, the substituted lactone starting materials are beta-propiolactone and beta-butyrolactone. For such poly(hydroxyalkanoate) copolymers, the copolymer preferably comprises from about 10 to about 90 mole percent of the first repeat unit and from about 90 to about 10 mole percent of the second repeat unit.

In other embodiments, the poly(hydroxyalkanoate) is more a terpolymer, in which $R_1$ is methyl and $R_2$ is propyl. In such embodiments, the substituted lactone starting materials are beta-propiolactone, beta-butyrolactone, and beta-valerolactone. For such poly(hydroxyalkanoate) terpolymers, the terpolymer preferably comprises from about 15 to about 75 mole percent of the first repeat unit, from about 75 to about 15 mole percent of the second repeat unit, and from about 1 to about 5 mole percent of the third repeat unit.

Both the polymerization of the first charge to produce the first portion of the poly(hydroxyalkanoate) and the polymerization of the second charge to produce the second portion of the poly(hydroxyalkanoate) may be carried out on either a batch basis or on a continuous basis.

For instance, a batch of the first portion may be polymerized in a first batch reactor, and a batch of the second portion may be polymerized in a second batch reactor. The first and second portions of the poly(hydroxyalkanoate) may then be melt-blended for example in an extruder or other melt mixing device.

More preferably, however, both the first and the second portions of the poly(hydroxyalkanoate) may be produced on a continuous basis. A preferred reactor for this continuous polymerization process is a loop reactor in which the reactants flow and recirculate through a loop of piping. Monomer, catalyst, and new solvent are fed into this loop at one spot, and reacted polymer is removed at a different spot in the loop in a continuous fashion.

In a particularly preferred embodiment, the method of the present disclosure may be carried out using two loop reactors operating in series. The first charge of lactone, along with catalyst and solvent, are added to a first loop reactor and polymerized therein to produce the first portion of poly (hydroxyalkanoate) having the first (higher) weight average molecular weight. Once polymerized, the first portion of the poly(hydroxyalkanoate) is then transferred to a second loop reactor. The second charge of lactone, along with catalyst and solvent, are added to the second loop reactor and polymerized therein to produce the second portion of poly (hydroxyalkanoate) having the second (lower) weight average molecular weight.

Thus, according to this embodiment, the second charge is polymerized to form the second portion in the presence of the first portion. It may be seen then that, according to this embodiment, the step of blending the first portion and the second portion is carried out by polymerizing the second charge to form the second portion in the presence of the first portion.

For both of the polymerization steps, suitable solvents for carrying out the reaction include tetrahydrofuran and methyl (t-butyl ether). A catalyst or initiator is also preferably used. Suitable catalysts or initiators include quaternary ammonium salts. The amount of the catalyst or initiator may be different for the polymerization of the first charge and the polymerization of the second charge. For the polymerization of the first charge to produce the first portion of the poly (hydroxyalkanoate), the amount of catalyst or initiator is preferably about 1 part catalyst or initiator to about 5000 parts of the first charge. For the polymerization of the second charge to produce the second portion of the poly(hydroxyalkanoate), the amount of catalyst or initiator is preferably about 1 part catalyst or initiator to about 500 parts of the second charge.

The present disclosure is also further illustrated by the following embodiments:

Embodiment 1

A composition comprising:
a first portion of a poly(hydroxyalkanoate) and a second portion of the poly(hydroxyalkanoate),
wherein the first portion of the poly(hydroxyalkanoate) has a first weight average molecular weight and the second portion of the poly(hydroxyalkanoate) has a second weight average molecular weight which is at least 50 percent less than the first weight average molecular weight and
wherein the poly(hydroxyalkanoate) comprises at least 10 mole percent monomer repeat units of 3-hydroxypropionate.

Embodiment 2

The composition of Embodiment 1, wherein the poly (hydroxyalkanoate) comprises poly(3-hydroxypropionate).

Embodiment 3

The composition of Embodiment 1, wherein the poly (hydroxyalkanoate) is a copolymer or a terpolymer which comprises
a first repeat unit which is (3-hydroxypropionate),
a second repeat unit according to Formula I

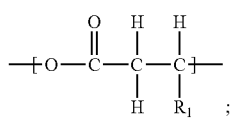

Formula I and
optionally, a third repeat unit according to Formula II,

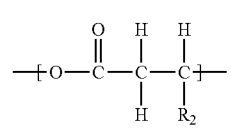

Formula II wherein $R_1$ and $R_2$ are each independently selected from the group consisting of linear or branched alkyl groups having from 1 to 22 carbon atoms.

Embodiment 4

The composition of Embodiment 3, wherein the poly (hydroxyalkanoate) comprises a copolymer and $R_1$ is methyl.

Embodiment 5

The composition of Embodiment 4, wherein the poly (hydroxyalkanoate) copolymer comprises from about 10 to about 90 mole percent of the first repeat unit and from about 90 to about 10 mole percent of the second repeat unit.

Embodiment 6

The composition of Embodiment 3, wherein the poly (hydroxyalkanoate) comprises a terpolymer, $R_1$ is methyl, and $R_2$ is propyl.

Embodiment 7

The composition of Embodiment 6, wherein the poly (hydroxyalkanoate) terpolymer comprises from about 15 to about 75 mole percent of the first repeat unit, from about 75 to about 15 mole percent of the second repeat unit, and from about 1 to about 5 mole percent of the third repeat unit.

Embodiment 8

The composition of any of the preceding Embodiments, wherein the composition comprises from about 90 to about 50 weight percent of the first portion of the poly(hydroxyalkanoate) and from about 50 to about 10 weight percent of the second portion of the poly(hydroxyalkanoate).

Embodiment 9

The composition of any of the preceding Embodiments, wherein the first weight average molecular weight is at least 100,000 daltons, as determined by ASTM D5296 and the second weight average molecular weight is less than about 25,000 daltons, as determined by ASTM D5296.

Embodiment 10

The composition of any of the preceding Embodiments, wherein the composition has a polydispersity of at least 1.9, as determined by ASTM D5296.

Embodiment 11

The composition of any of the preceding Embodiments, wherein the weight ratio of the first portion of the poly (hydroxyalkanoate) to the second portion of the poly(hydroxyalkanoate) from about 1:1 to about 9:1.

Embodiment 12

A film comprising the composition of any of the preceding Embodiments.

Embodiment 13

A fiber comprising the composition of any of the preceding Embodiments.

Embodiment 14

A method for making a composition having a first portion of a poly(hydroxyalkanoate) and a second portion of the poly(hydroxyalkanoate), the method comprising the steps of:
polymerizing a first charge of at least one substituted lactone to produce a first portion of a poly(hydroxyalkanoate) having a first weight average molecular weight;
polymerizing a second charge of the at least one substituted lactone to produce a second portion of the poly (hydroxyalkanoate) having a second weight average molecular weight; and
blending the first portion and the second portion to produce a final poly(hydroxyalkanoate),
wherein the at least one substituted lactone comprises beta-propiolactone and the poly(hydroxyalkanoate) comprises monomer repeat units of 3-hydroxypropionate, and
wherein the second weight average molecular weight is at least 50 percent less than the first weight average molecular weight.

Embodiment 15

The method of Embodiment 14, wherein the poly(hydroxyalkanoate) comprises poly(3-hydroxypropionate).

Embodiment 16

The method of Embodiment 14, wherein the poly(hydroxyalkanoate) is a copolymer or a terpolymer which comprises
a first repeat unit which is (3-hydroxypropionate),
a second repeat unit according to Formula I

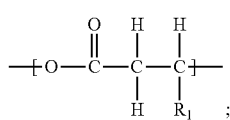

Formula I and
optionally, a third repeat unit according to Formula II,

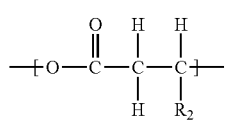

Formula II wherein $R_1$ and $R_2$ are each independently selected from the group consisting of linear or branched alkyl groups having from 1 to 22 carbon atoms.

Embodiment 17

The method of any of Embodiments 14-16, wherein the first charge is polymerized in a first loop reactor.

Embodiment 18

The method of any of Embodiments 14-17, wherein the second charge is polymerized in a second loop reactor.

Embodiment 19

The method of any of Embodiments 14-18, wherein the step of blending the first portion and the second portion is carried out by polymerizing the second charge to form the second portion in the presence of the first portion.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for making a composition having a first portion of a poly (hydroxyalkanoate) and a second portion of the poly (hydroxyalkanoate), the method comprising the steps of:
polymerizing a first charge of at least one substituted lactone to produce a first portion of a poly (hydroxyalkanoate) having a first weight average molecular weight;
polymerizing a second charge of the at least one substituted lactone to produce a second portion of the poly (hydroxyalkanoate) having a second weight average molecular weight; and
blending the first portion and the second portion to produce a final poly (hydroxyalkanoate),
wherein the at least one substituted lactone comprises beta-propiolactone and the poly (hydroxyalkanoate) comprises monomer repeat units of 3-hydroxypropionate, and wherein the second weight average molecular weight is at least 50 percent less than the first weight average molecular weight, and
wherein the step of blending the first portion and the second portion is carried out by polymerizing the second charge to form the second portion in the presence of the first portion.

2. The method of claim 1, wherein the poly (hydroxyalkanoate) comprises poly (3-hydroxypropionate).

3. The method of claim 1, wherein the poly (hydroxyalkanoate) is a copolymer or a terpolymer which comprises a first repeat unit which is (3-hydroxypropionate), a second repeat unit according to Formula I

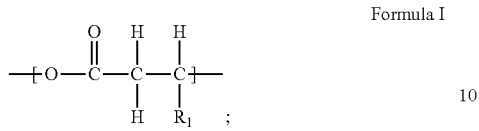

Formula I and
optionally, a third repeat unit according to Formula II,

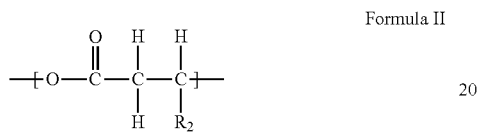

Formula II wherein $R_1$ and $R_2$ are each independently selected from the group consisting of linear or branched alkyl groups having from 1 to 22 carbon atoms.

4. The method of claim 1, wherein the first charge is polymerized in a first loop reactor.

5. The method of claim 1, wherein the second charge is polymerized in a second loop reactor.

* * * * *